US005543481A

United States Patent [19]
Takeuchi et al.

[11] Patent Number: 5,543,481
[45] Date of Patent: Aug. 6, 1996

[54] PROCESS FOR PRODUCING A STYRENIC POLYMER

[75] Inventors: Mizutomo Takeuchi; Norio Tomotsu, both of Ichihara, Japan

[73] Assignee: Idemitsu Kosan Co., Ltd., Tokyo, Japan

[21] Appl. No.: 440,135

[22] Filed: May 12, 1995

Related U.S. Application Data

[63] Continuation of Ser. No. 213, Jan. 4, 1993, Pat. No. 5,461,128.

[30] Foreign Application Priority Data

Jan. 8, 1992 [JP] Japan .................................. 4-001231

[51] Int. Cl.⁶ .......................... C08F 4/649; C08F 12/08
[52] U.S. Cl. ...................... 526/126; 526/133; 526/134; 526/135; 526/140; 526/142; 526/146; 526/160; 526/170; 526/346
[58] Field of Search .................................. 526/160, 170, 526/126, 127, 133, 134, 135, 140, 142, 146, 161

[56] References Cited

U.S. PATENT DOCUMENTS

| | | | |
|---|---|---|---|
| 5,066,741 | 11/1991 | Campbell, Jr. | 526/171 |
| 5,132,380 | 7/1992 | Stevens et al. | 526/126 |
| 5,155,080 | 10/1992 | Elder et al. | 526/170 X |
| 5,272,229 | 12/1993 | Tomotsu et al. | 526/160 X |

*Primary Examiner*—Fred Teskin
*Attorney, Agent, or Firm*—Oblon, Spivak, McClelland, Maier & Neustadt, P.C.

[57] ABSTRACT

There are disclosed a catalyst which comprises (A) a titanium compound having one π electron-based ligand (e.g. pentamethylcyclopentadienyl group) or two same π electron-based lignads and (B) an ionic compound comprising a non-coordinate anion and a cation of an element typifying the group 4 elements of the Periodic Table (e.g. triphenylcarbonium tetra(pentafluorophenyl)borate; a catalyst comprising (C) an alkylating agent (e.g. triisobutylaluminum) in addition to the components (A) and (B); and a process for producing a styrenic polymer by the use of any of the aforesaid catalysts. By using the aforementioned catalyst and process, a highly syndiotactic styrenic polymer can be efficiently produced.

9 Claims, No Drawings

PROCESS FOR PRODUCING A STYRENIC POLYMER

This is a Continuation of application Ser. No. 08/000,213 filed on Jan. 4, 1993 now U.S. Pat. No. 5,461,128.

BACKGROUND OF THE INVENTION

1. Field of the Invention

The present invention relates to a process for producing a styrenic polymer and a catalyst for use therein. More particularly, it pertains to a process for efficiently producing a styrenic polymer having a high degree of syndiotactic configuration in the stereochemical structure of the polymer main chain and to a catalyst to be used in the process.

2. Description of the Related Arts

It has recently been disclosed by the research group of the present inventors that a styrenic polymer having a syndiotactic configuration is obtained by polymerizing a styrenic monomer by the use of a catalyst comprising as primary ingredients a transition-metal compound, especially a titanium compound and an alkylaluminoxane (Refer to Japanese Patent Application Laid-Open Nos. 187708/1987, 179906/1988, 241009/1988, etc.).

Methylaluminoxane, particularly suitable as an alkylaluminoxane is obtained usually by the reaction between trimethylaluminum and water. However, the above-mentioned reaction involves the problem that the reaction is difficult to put into practical production because of its violent reaction, and further suffers the disadvantages that in addition to requiring expensive trimethylaluminum as the starting material, an excessively large amount of methylaluminoxane is required as a component of the catalyst as compared with the amount of a transition metal, thus causing an extremely expensive catalyst, and further that a large amount of residual ash component remains in the product resin.

There has recently been reported that a polymerization catalyst not containing aluminoxane is capable of polymerizing α-olefin (principally, ethylene) by R. Taube (J. Organomet. Chem. C9–C11, 347 (1988)), H. Turner (J. Am. Chem. Soc. 111,2728 (1989)), R. F. Jordan (Organomet. 8,2892 (1989)), etc. As for styrenic monomer, there is disclosed in Japanese Patent Application Laid-Open No. 124706/1991, a process for producing a styrenic polymer free from aluminoxane by the use of an iron complex salt or an ammonium salt in place of alumioxane. Nevertheless the process still involves the problems that the use the iron complex salt causes coloring of the resultant resin due to the iron component as the residual ash in the resin, while the ammonium salt is not sufficient in catalytic activity.

Under such circumstances, intensive research and investigation were concentrated by the present inventors into the development of a catalyst capable of efficiently polymerizing a styrenic monomer into the styrenic polymer having a high degree of syndiotactic configuration with a least possible content of residual ash without the use of expensive aluminoxane required in a large amount and of the development of the process for producing the styrenic polymer by the use of the aforementioned catalyst.

SUMMARY OF THE INVENTION

As a result, it has been found by the present inventors that the use of a catalyst combination comprising a specific titanium compound and a specific ionic compound or a catalyst combination comprising an alkylating agent in addition to the aforesaid two specific compounds is capable of efficiently producing the objective styrenic polymer having a high degree of syndiotactic configuration by virtue of its markedly improved activity.

The present invention has been accomplished on the basis of the above-mentioned finding and information.

Specifically, the present invention provides a catalyst which comprises (A) a titanium compound represented by the general formula (I)

$$\text{TiR}^1\text{XYZ} \tag{I}$$

wherein $R^1$ is a cyclopentadienyl group, a substituted cyclopentadienyl group, an indenyl group, a substituted indenyl group, a fluorenyl group or a substituted fluorenyl group; and X, Y and Z, independently of one another, are each a hydrogen atom, an alkyl group having 1 to 12 carbon atoms, an alkoxy group having 1 to 12 carbon atoms, a thioalkoxy group having 1 to 20 carbon atoms, an aryl group having 6 to 20 carbon atoms, an aryloxy group having 6 to 20 carbon atoms, a thioaryloxy group having 6 to 20 carbon atoms, an arylalkyl group having 7 to 20 carbon atoms or a halogen atom, or the general formula (II)

$$\text{Ti}(R^2)_2 R^3 R^4 \tag{II}$$

wherein $R^2$ is a cyclopentadienyl group, a substituted cyclopentadienyl group, an indenyl group, a substituted indenyl group, a fluorenyl group or a substituted fluorenyl group; $R^3$ and $R^4$ are each a hydrogen atom, an alkyl group having 1 to 20 carbon atoms, an alkoxy group having 1 to 20 carbon atoms, a thioalkoxy group having 1 to 20 carbon atoms, an aryl group having 6 to 20 carbon atoms, an aryloxy group having 6 to 20 carbon atoms, a thioaryloxy group having 6 to 20 carbon atoms, an arylalkyl group having 7 to 20 carbon atoms, a halogen atom or an amino group; and $R^2$ may be crosslinked by an alkylidene group having 1 to 5 carbon atoms, an alkylsilyl group having 1 to 20 carbon atoms and 1 to 5 silicon atoms or a germanium-containing hydrocarbon group having 1 to 20 carbon atoms and 1 to 5 germanium atoms; and (B) an ionic compound comprising a noncoordinate anion and a cation of an element typifying the group 4 elements of the Periodic Table. The present invention also provides a catalyst which comprises the above-mentioned components (A) and (B) and an alkylating agent. The present invention further provides a process for producing a styrenic polymer characterized by the use of the aforesaid catalyst in the case of polymerizing at least one styrenic monomer selected from styrene and a derivative thereof.

DESCRIPTION OF THE PREFERRED EMBODIMENTS

The catalyst according to the present invention comprises as principal components the above-mentioned components (A) and (B), or the components (A), (B) and (C).

As the titanium compound, that is, the component (A) of the catalyst, there is exemplified by the compound having one π electron-based ligand represented by the general formula (I)

$$\text{TiR}^1\text{XYZ} \tag{I}$$

wherein $R^1$ is a cyclopentadienyl group, a substituted cyclopentadienyl group, an indenyl group, a substituted indenyl group, a fluorenyl group or a substituted fluorenyl group; and X, Y and Z, independently of one another, are each a hydrogen atom, an alkyl group having 1 to 12 carbon atoms, an alkoxy group having 1 to 12 carbon atoms, a thioalkyl group having 1 to 20 carbon atoms, an aryl group having 6 to 20 carbon atoms, an aryloxy group having 6 to 20 carbon atoms, a thioaryloxy group having 6 to 20 carbon atoms, an arylalkyl group having 7 to 20 carbon atoms or a halogen atom, namely mono[(substituted)cyclopentadienyl]titanium compound, mono[(substituted)indenyl]titanium compound and mono[(substituted)fluorenyl]titanium compound.

The substituted cyclopentadienyl group represented by $R^1$ in the above formula is, for example, a cyclopentadienyl group substituted by at least one alkyl group having 1 to 6 carbon atoms, more specifically, methylcyclopentadienyl group; 1,3-dimethylcyclopentadienyl group; 1,2,4-trimethylcyclopentadienyl group; 1,2,3,4-tetramethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-(tert-butyl)cyclopentadienyl group; pentaalkylcyclopentadienyl group (pentamethylcyclopentadienyl group; and ethyltetramethylcyclopentadienyl group). Examples of the substituted indenyl group include methylindenyl group, dimethylindenyl group and trimethylindenyl group. In addition, examples of the substituted fluorenyl group include methylfluorenyl group. Among the above-mentioned compounds are desirable tetra-substituted cyclopentadienyl group and penta-substituted cyclopentadienyl group, and is particularly desirable pentamethylcyclopentadienyl group.

In addition, X, Y and Z, independently of one another, are each a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group, ethoxy group, propoxy group, butoxy group, amyloxy group, hexyloxy group, octyloxy group and 2-ethylhexyloxy group, a thioalkoxy group having 1 to 20 carbon atoms (specifically, thiomethoxy group), an aryl group having 6 to 20 carbon atoms (specifically, phenyl group and naphthyl group), an aryloxy group having 6 to 20 carbon atoms (specifically, phenoxy group), a thioaryloxy group having 6 to 20 carbon atoms (specifically thiophenoxy group), an arylalkyl group having 7 to 20 carbon atoms (specifically, benzyl group) or a halogen atom (specifically, chlorine, bromine, iodine and fluorine). Two or three among X, Y and Z may be the same.

Specific examples of the titanium compounds represented by the general formula (I) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,2,4-trimethylcyclopentadienyltrimethyltitanium, 1,2,3,4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, pentamethylcyclopentadienyltitanium trithiomethoxide and pentamethylcyclopentadienyltitanium trithiophenoxide.

The mono[(substituted cyclopentadienyl)]titanium compound may be the compound represented by the general formula (III) in which a cyclopentadienyl group is bonded to a metal via an arbitrary substituent group.

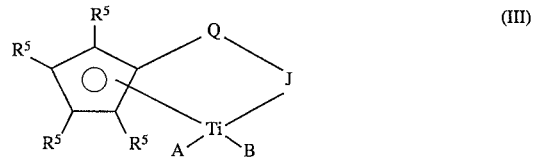

wherein $R^5$ is a hydrogen atom, an alkyl group, an aryl group or a silyl group and may be the same or different; J is an oxygen atom, a sulfur atom, $NR^6$ or $PR^6$ and is bonded to a cyclopentadienyl group via Q; $R^6$ is a hydrogen atom, an alkyl group, an aryl group or a silyl group; Q is $SiR^7_2$, $CR^7_2$, $SiR^7_2SiR^7_2$, $CR^7_2CR^7_2$, $SiR^7_2SiR^7_2SiR^7_2$ or $CR^7_2CR^7_2CR^7_2$; $R^7$ is a hydrogen atom, an alkyl group, an aryl group or a silyl group and may be the same or different; A and B are each selected from a hydride, a halogen atom, an alkyl group, a silyl group, an aryl group, an amide group, an aryloxy group, an alkoxy group, a silyloxy group, a phophide group, a sulfide group, an acyl group, an azide group, a combination thereof and a neutral Lewis base.

Another titanium compound, that is, the component (A) of the catalyst, there is exemplified by the compound having two π electron-based ligands represented by the general formula (II)

$$Ti(R^2)_2R^3R^4 \quad \text{(II)}$$

wherein $R^2$ is a cyclopentadienyl group, a substituted cyclopentadienyl group, an indenyl group, a substituted indenyl group, a fluorenyl group or a substituted fluorenyl group; $R^3$ and $R^4$ are each a hydrogen atom, an alkyl group having 1 to 20 carbon atoms, an alkoxy group having 1 to 20 carbon atoms, a thioalkoxy group having 1 to 20 carbon atoms, an aryl group having 6 to 20 carbon atoms, an aryloxy group having 6 to 20 carbon atoms, a thioaryloxy group having 6 to 20 carbon atoms, an arylalkyl group having 7 to 20 carbon atoms, a halogen atom or an amino group; and $R^2$ may be crosslinked by an alkylidene group having 1 to 5 carbon atoms, an alkylsilyl group having 1 to 20 carbon atoms and 1 to 5 silicon atoms or a germanium-containing hydrocarbon group having 1 to 20 carbon atoms and 1 to 5 germanium atoms, namely, di[(substituted)cyclopentadienyl]titanium compound, di[(substituted indenyl]titanium compound and di[(substituted)fluorenyl]titanium compound. The substituted cyclopentadienyl group represented by $R^2$ in the above formula is, for example, a cyclopentadienyl group substituted by at least one alkyl group having 1 to 6 carbon atoms, more specifically, methylcyclopentadienyl group; 1,3-dimethylcyclopentadienyl group; 1,2,4-trimethylcyclopentadienyl group; 1,2,3,4-tetramethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-(tert-butyl)cyclopentadienyl group; pentaalkylcyclopentadienyl group (pentamethylcyclopentadienyl group; and ethyltetramethylcyclopentadienyl group). Examples of the substituted indenyl group include methylindenyl group, dimethylindenyl group and trimethylindenyl group. In addition, examples of the substituted fluorenyl group include methylfluorenyl group. Among the above-mentioned compounds are particularly desirable cyclopentadienyl group and substituted cyclopentadienyl group. Both or either of $(R^2)_2$ may be crosslinked by an alkylidene group having 1 to 5 carbon atoms, more specifically, methylidyne group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like; or a germanium-containing hydrocarbon group having 1 to 20 carbon atoms and 1 to 5 germanium atoms.

Each of $R^3$ and $R^4$, independently of one another, as described above but more specifically, a hydrogen atom; an alkyl group having 1 to 20 carbon atoms (specifically, methyl group, ethyl group, propyl group, n-butyl group, isobutyl group, amyl group, isoamyl group, octyl group and 2-ethylhexyl group), an alkoxy group having 1 to 20 carbon atoms (specifically, methoxy group, ethoxy group, propoxy group, butoxy group, amyloxy group, hexyloxy group, octyloxy group and 2-ethylhexyloxy group, a thioalkoxy group having 1 to 20 carbon atoms (specifically, thiomethoxy group), an aryl group having 6 to 20 carbon atoms (specifically, phenyl group and naphthyl group), an aryloxy group having 6 to 20 carbon atoms (specifically, phenoxy group), a thioaryloxy group having 6 to 20 carbon atoms (specifically thiophenoxy group), an arylalkyl group having 7 to 20 carbon atoms (specifically, benzyl group) or, a halogen atom or an amino group.

Specific examples of the titanium compound represented by the general formula (II) include bis(cyclopentadienyl)dimethyltitanium; bis(cyclopentadienyl)diethyltitanium; bis(cyclopentadienyl)dipropyltitanium; bis(cyclopentadienyl)dibutyltitanium: bis(methylcyclopentadienyl)dimethyltitanium; bis(tert-butylcyclopentadienyl)dimethyltitanium; bis(1,3-dimethylcyclopentadienyl)dimethyltitanium; bis(1,3-di-tert-butylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(cyclopentadienyl)dimethyltitanium; bis(trimethylsilylcyclopentadienyl)dimethyltitanium; bis(1,3-di(trimethylsilyl)cyclopentadienyl)dimethyltitanium; bis[1,2,4-tri(trimethylsilyl)cyclopentadienyl]dimethyltitanium; bis(indenyl)dimethyltitanium; bis(fluorenyl)dimethyltitanium; methylenebis(cyclopentadienyl)dimethyltitanium; ethylidenebis(cyclopentadienyl)dimethyltitanium; methylenebis(2,3,4,5-tetramethylcyclopentadienyl)dimethyltitanium; ethylidenebis(2,3,4,5-tetramethylcyclopentadienyl)dimethyltitanium; dimethylsilylbis(2,3,4,5-tetramethylcyclopentadienyl)dimethyltitanium; methylenebisindenyldimethyltitanium; ethylidenebisindenyldimethyltitanium; dimethylsilylbisindenyldimethyltitanium; methylenebisfluorenyldimethyltitanium; ethylidenbisfluorenyldimethyltitanium; dimethylsilylbisfluorenyldimethyltitanium; bis(cyclopentadienyl)dibenzyltitanium; bis(tert-butylcyclopentadienyl)dibenzyltitanium; bis(methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis[1,3-di(trimethylsilyl)cyclopentadienyl]dibenzyltitanium; bis[1,2,4-tri(trimethylsilyl)cyclopentadienyl]dibenzyltitanium; bis(indenyl)dibenzyltitanium; bis(fluorenyl)dibenzyltitanium; methylenebis(cyclopentadienyl)dibenzyltitanium; ethylidenebis(cyclopentadienyl)dibenzyltitanium; methylenebis(2,3,4,5-tetramethylcyclopentadienyl)dibenzyltitanium; ethylidenebis(2,3,4,5-tetramethylcyclopentadienyl)dibenzyltitanium; dimethylsilylbis(2,3,4,5-tetramethylcyclopentadienyl)dibenzyltitanium; methylenebis(indenyl)dibenzyltitanium; ethylidenebis(indenyl)dibenzyltitanium; dimethylsilylbis(indenyl)dibenzyltitanium; methylenebis(fluorenyl)dibenzyltitanium; ethylidenebis(fluorenyl)dibenzyltitanium; dimethylsilylbis(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium dipheoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl)titanium dimethoxide; bispentamethylcyclopentadienyltitanium dimethoxide; bis(trimethylsilylcyclopentadienyl)titanium dimethoxide; bis[1,3-di(trimethylsilyl)cyclopentadienyl]titanium dimethoxide; bis [1,2,4-tri(trimethylsilyl)cyclopentadienyl]titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)titanium dimethoxide; ethylidenebis(2,3,4,5-tetramethylcyclopentadienyl)titanium dimethoxide; dimethylsilylbis(2,3,4,5-tetramethylcyclopentadienyl)titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis(methylfluorenyl)titanium dimethoxide; ethylidenebisfluorenyltitanium dimethoxide; dimethylsilylbisfluorenyltitanium dimethoxide;

In addition to the combinations of the above, the compound may be a bidentate coordination complex such as 2,2'-thiobis(4-methyl-6-tert-butylphenyl)titanium diisopropoxide and 2,2'-thiobis(4-methyl-6-tert-butylphenyl)titanium dimethoxide.

On the other hand, the component (B) of the catalyst according to the present invention is an ionic compound comprising a non-coordinate anion and a cation of an element typifying the group 4 elements of the Periodic Table. Examples of the non-coordinate anion include the anion represented by the general formula (IV)

wherein $M^1$ is a metal selected from groups 5 to 15 of the Periodic Table; $X^1$ to $X^n$ are each a hydrogen atom, a dialkylamino group, an alkoxy group, an aryloxy group, an alkyl group having 1 to 20 carbon atoms, an aryl group (inclusive of halogen-substituted aryl group), having 6 to 20 carbon atoms, an alkylaryl group having 7 to 20 carbon atoms, an arylalkyl group having 7 to 20 carbon atoms, a substituted alkyl group, an organometalloid group or a halogen atom; m is the valency of $M^1$, indicating an integer of 1 to 7; and n is an integer of 2 to 8.

Specific examples of $M^1$ include B, Al, Si, P, As, Sb, etc. Specific examples of $X^1$ to $X^n$ include a dialkylamino group such as dimethylamino and diethylamino; an alkoxyl group such as methoxy, ethoxy and n-butoxy; an aryloxy group such as phenoxy, 2,6-dimethylphenoxy and naphthyloxy; an alkyl group having 1 to 20 carbon atoms such as methyl, ethyl, n-propyl, iso-propyl, n-butyl, n-octyl and 2-ethylhexyl; an aryl group having 6 to 20 carbon atoms, mono- to penta-(fluoro)phenyl; an arylalkyl group having 7 to 20 carbon atoms such as benzyl; an alkylaryl group having 7 to 20 carbon atoms such as p-tolyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; a halogen atom such as F, Cl, Br and I; and an organometalloid group such as pentamethylantimony group, trimethylsilyl group, trimethylgermyl group, diphenylarsine group, dicyclohexylantimony group and diphenylboron group.

Specific examples of the above-mentioned anion include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $BF_4^-$, $PF_6^-$, $P(C_6F_5)_6^-$, $Al(C_6F_5)_4^-$, etc.

Among the above mentioned anion is particularly desirable $B(C_6F_5)_4^-$, that is tetra(pentafluorophenyl)borate.

On the other hand, there are available various cations of an element typifying the group 4 elements of the Periodic Table exemplified by carbonium cation, silyl cation, germanium cation represented by the general formula (V)

$$M^2 R^8 R^9 R^{10} \quad (V)$$

wherein $M^2$ is an element typifying the group 4 elements, and $R^8$, $R^9$ and $R^{10}$ are each a hydrogen atom, an alkyl group having 1 to 20 carbon atoms, an aryl group having 6 to 20 carbon atoms, an alkoxy group having 1 to 20 carbon atoms or a thioalkoxy group having 1 to 20 carbon atoms and may be the same or different. Specific examples of the above-mentioned cation include triphenylcarbonium cation; 4,4',4''-tri(methoxyphenyl)-carbonium cation; 4,4'-di(methoxyphenyl)phenylcarbonium cation; tri(tolyl)carbonium cation; 4,4',4''-tri(chlorophenyl)carbonium cation; triphenylsilyl cation, trimethoxysilyl cation; tri(thioisopropyl)silyl cation; trimethylsilyl cation; 4,4',4''-tri(methoxyphenyl)silyl cation; tri(tolyl)silyl cation and 4,4',4''-tri(chlorophenyl)silyl cation, among which is particularly desirable the cation in which $M^2$ is C, that is, carbonium cation.

The component (B) of the catalyst according to the present invention is an ionic compound comprising the above-mentioned non-coordinate anion and a cation of an element typifying the group 4 elements. Examples of such ionic compound include triphenylcarbonium tetra(pentafluorophenyl)borate; 4,4',4''-tri(methoxyphenyl)carbonium tetra(pentafluorophenyl)borate; tri(tolyl)carbonium tetra(pentafluorophenyl)borate; 4,4',4''-tri(chlorophenyl)carbonium tetra(pentafluorophenyl)borate; triphenylsilyl tetra(pentafluorophenyl)borate; trimethoxysilyl tetra(pentafluorophenyl)borate; tri(thioisopropyl)silyl tetra(pentafluorophenyl)borate; trimethylsilyl tetra(pentafluorophenyl)borate; 4,4',4''-tri(methoxyphenyl)silyl tetra(pentafluorophenyl)borate; tri(tolyl)silyl tetra(pentafluorophenyl)borate; and 4,4', 4''-tri(chlorophenyl)silyl tetra(pentafluorophenyl)borate.

In the catalyst according to the present invention is used, when necessary, an alkylating agent as component (C).

There are available various alkyl group-containing compounds as alkylating agents, which are exemplified by the aluminum compound having an alkyl group represented by the general formula (VI)

$$R^{11}_p Al(OR^{12})_q X'_{3-p-q} \quad (VI)$$

wherein $R^{11}$ and $R^{12}$ are each an alkyl group having 1 to 8, preferably 1 to 4 carbon atoms, X' is a hydrogen atom or a halogen atom, p satisfies the relation $0<p\leq 3$, desirably p=2 or 3 most desirably p=3, and q satisfied the relation $0\leq q\leq 3$, desirably q=0 or 1; the magnesium compound having an alkyl group represented by the general formula (VII)

$$R^{11}_2 Mg \quad (VII)$$

wherein $R^{11}$ is as previously defined; the zinc compound having an alkyl group represented by the general formula (VIII)

$$R^{11}_2 Zn \quad (VIII)$$

wherein $R^{11}$ is as previously defined; and the like.

The above-mentioned compounds having an alkyl group are desirably aluminum compounds having an alkyl group, more desirably trialkylaluminium compounds and dialkylaluminum compounds. Examples of the compounds, that is, the components (C) include trialkylaluminum such as trimethylaluminum, triethylaluminum, tri-n-propylaluminum, triisopropylaluminum, tir-n-butyl-aluminum, triisobutylaluminum and tir-tert-butylaluminum; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dimethylaluminum ethoxide; dialkylaluminum hydride such as dimethylaluminum hydride, diethylaluminu hydride and diisobutylaluminum hydride, dialkylmagensium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

The catalyst according to the present invention comprises as the principal components the above-mentioned components (A) and (B), or the components (A), (B) and (C), and may be incorporated with a catalytic component in addition to the above components. The compounding ratios (A):(B) and (A):(B):(C) in the catalyst vary depending upon various conditions and can not be unequivocally defined. Under ordinary circumstances, however, the molar ratio of (A) to (B) is 1:10 to 10:1 and that of (A) to (C) is 1:0.01 to 1:1,000.

The catalyst according to the present invention as described hereinbefore exhibits a high activity in the production of a styrenic polymer having a high degree of syndiotactic configuration. Hence, the present invention further provides a process for producing a styrenic polymer having a high degree of syndiotactic configuration by the use of the above-described catalyst.

The production of a styrenic polymer according to the present invention is put into practice by polymerizing or copolymerizing at least one styrenic monomer selected from the group consisting of styrene and derivatives thereof such as an alkylstyrene, an alkoxystyrene, a halogenated styrene and a vinyl benzoate ester in the presence of the catalyst comprising as the principal the components (A) and (B) and, when necessary, the component (C).

The catalyst according to the present invention is brought into contact with styrenic monomer/s by any one of the various methods including:

(1) a method in which the reaction product of the components (A) and (B) as the catalyst is brought into contact with monomer/s to be polymerized;

(2) a method in which the reaction product of the components (A) and (B) is incorporated with the component (C) to produce the catalyst, which is then brought into contact with monomer/s to be polymerized;

(3) a method in which the reaction product of the components (A) and (C) is incorporated with the component (B) to produce the catalyst, which is then brought into contact with monomer/s to be polymerized;

(4) a method in which each of the components (A), (B) and (C) is added to monomer/s to be polymerized one by one in any order.

The reaction product of the components (A) and (B) may be isolated and purified in advance.

The addition or contact of the above-mentioned components (A), (B) and (C) may be carried out at a temperature of 0° to 100° C. and, needless to say, at the polymerization temperature.

The polymerization of a styrenic monomer or monomers may be carried out by means of bulk polymerization or solution polymerization by the use of an aliphatic hydrocarbon solvent such as pentane, hexane or heptane, an alicyclic hydrocarbon solvent such as cyclohexane or an aromatic hydrocarbon solvent such as benzene, toluene or xylene. The polymerization temperature is not specifically limited, but is usually in the range of 0° to 90° C., preferably 20° to 70° C.

The molecular weight of the styrenic polymer to be obtained can be effectively modified by means of polymerization reaction in the presence of hydrogen.

The styrenic polymer thus obtained possesses a high degree of syndiotactic configuration. Here, the styrenic polymer having a high degree of syndiotactic configuration means that its stereochemical structure is mainly of syndiotactic configuration, i.e. the stereostructure in which phenyl groups or substituted phenyl group as side chains are located alternately at opposite directions relative to the main chain consisting of carbon-carbon bonds. Tacticity is quantitavely determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two sturctural units are connected to each other, a triad in which three structural units are connected to each other and a pentad in which five structural units are connected to each other. "The styrenic polymers having a high degree of syndiotactic configuration" as mentioned in the present invention means polystyrene, poly(alkylstyrene), poly(halogenated styrene), poly(alkoxystyrene), poly(vinylbenzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(m-ethylstyrene), poly(ethylstyrene) poly(isopropylstyrene), poly(tert-buthylstyrene), etc., poly(halogenated styrene) include, poly(chlorostyrene), poly(bromostyrene), and poly(fluorostyrene), etc. The poly(alkoxystyrene) include, poly(methoxystyrene), poly(ethoxystyrene), etc.

The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The styrenic polymer obtained according to the process of the present invention is that with a high degree of syndiotacticity usually having a weight-average molecular weight of 10,000 to 10,000,000, preferably 100,000 to 5,500,000 with a number-average molecular weight of 5,000 to 5,500,000, preferably 50,000 to 2,500,000. The resultant polymer has a high degree syndiotactic configuration as such as described above, and a styrene polymer having an exceptionally high degree of syndiotacticity as well as an extremely high purity can be obtained by the steps of deashing treatment of the polymer thus obtained, as required, with a washing agent containing hydrochloric acid, etc.; additional washing; drying under reduced pressure; cleaning with a solvent such as methyl ethyl ketone for removing solubles therein; and treatment of the insolubles thus obtained by the use of chloroform, etc.

The styrene polymer with a high degree of syndiotacticity has a melting point of 160° to 310° C. and is surpassingly superior to the conventional styrenic polymer having an atactic configuration in terms of heat resistance.

The catalyst according to the present invention is inexpensive as compared with the conventinoal catalysts comprising an aluminoxane as the primary component, exerts a high activity for the production of a styrenic polymer having a high degree of syndiotactic configuration and furthermore can reduce all of the residual metallic amounts in the course of the polymer production process, thereby enabling the simplification of the production process. According to the process of the present invention, therefore, a syndiotactic styrenic polymer can be obtained at a reduced production cost with enhanced efficiency.

In the following, the present invention will be described in more detail with reference to preparation example, non-limitative examples and comparative examples.

PREPARATION EXAMPLE (preparation of triphenylcarbonium tetra(pentafluorophenyl)borate)

Lithium tetra(pentafluorophenyl)borate in an amount of 4.0 g was suspended in 50 mL of toluene. To the resultant suspension was added 1.97 g of triphenylcarbonium triborate in 250 mL of toluene in the form of slurry at room temperature. The toluene-soluble portion was filetered away, and the toluene-insoluble portion was washed with 100 mL of toluene and subjected to extraction with 40 mL of methylene chloride. The insoluble portion was filtered away and the filtrate was added dropwise to 500 mL of pentane to obtain a yellow objective product as the insoluble.

EXAMPLE 1

In a 30 mL vessel which had been dried and purged with nitorgen were placed 10 mL of styrene and 15 μmol of triisobutylaluminum. The mixture was heated to raise the temperature thereof up to 70° C., incorporated with 0.50 μmol of pentamethylcyclopentadienyltirmethyltitanium and further with 0.5 μmol of triphenylcarbonium tetra(pentafluorophenyl)borate as obtained in the Preparation Example 1 to proceed with polymerization at 70° C. for 4 hours. After the completion of the reaction, the reaction product was dired to afford 3.60 g of a polymer.

The resultant polymer was cut into slices of 1 mm or less in thickness, which were subjected to Soxhlet extraction for 5 hours by the use of methyl ethyl keotne (MEK) as the extraction solvent. AS the result, syndiotactic polystyrene (SPS) was obtained as the raffinate at a yield of 2.72 g and a catalytic activity of 113.6 kg/g.Ti.

EXAMPLES 2 TO 7

The procedure in Example 1 was repeated except that the components (A), (B) and (C) as indicated in Table 1 were employed. The characteristics and catalytic activities of SPS thus obtained are given in Table 1.

TABLE 1

| | Component (A) | Component (B) |
|---|---|---|
| Example 1 | Cp*TiMe$_3$ | *¹ [Ph$_3$C][B(C$_6$F$_5$)$_4$] *⁶ |
| Example 2 | Cp*Ti(OMe)$_3$ | *² [Ph$_3$C][B(C$_6$F$_5$)$_4$] |
| Example 3 | Cp*TiBz$_3$ | *³ [Ph$_3$C][B(C$_6$F$_5$)$_4$] |
| Example 4 | Et, Me$_4$CpTi(OMe)$_3$ | *⁴ [Ph$_3$C][B(C$_6$F$_5$)$_4$] |
| Example 5 | Me$_4$CpTiMe$_3$ | *⁵ [Ph$_3$C][B(C$_6$F$_5$)$_4$] |
| Example 6 | Cp*TiMe$_3$ | [Ph$_3$C][B(C$_6$F$_5$)$_4$] |
| Example 7 | Cp*TiMe$_3$ | [Ph$_3$C][B(C$_6$F$_5$)$_4$] |

| | Component (C) | Catalytic activity (kg/g · Ti) | Characteristics*⁷ (%) |
|---|---|---|---|
| Example 1 | triisobutylaluminum | 113.6 | >90 |
| Example 2 | triisobutylaluminum | 12.0 | >90 |
| Example 3 | triisobutylaluminum | 86.8 | >90 |
| Example 4 | triisobutylaluminum | 17.5 | >90 |
| Example 5 | triisobutylaluminum | 55.7 | >90 |
| Example 6 | trimethylaluminum | 80.3 | >90 |
| Example 7 | none | 5.1 | >90 |

*¹Pentamethylcyclopentadienyltrimethyltitanium
*²Pentamethylcyclopentadienyltitanium trimethoxide
*³Pentamethylcyclopentadienyltribenzyltitanium
*⁴1-ethyl-2,3,4,5-tetramethylcyclopentadienyltitanium trimethoxide
*⁵tetramethylcyclopentadineyltrimethyltitanium
*⁶triphenylcarbonium tetra(pentafluorophenyl)borate
Note *⁷syndiotacticity (racemic pentad) as determined by ¹³C-NMR method

EXAMPLE 8

The procedure in Example 1 was repeated except that 30 μmol of triisobutylaluminum and 1.00 μmol of triphenylcarbonium tetra(pentafluorophenyl)borate was used. After the completion of the reaction, the reaction product was dried to afford 3.90 g of a polymer, which was subjected to Soxhlet extraction in the same manner as in Example 1. As the result, SPS was obtained as the raffinate at a yield of 3.83 g and a catalytic activity of 160.0 kg/g.Ti.

EXAMPLE 9

There were mixed in advance 15 mL of 0.5 mol/L triisobutylaluminum solution, 5 mL of 10 mmol/L pentamethylcyclopentadienyltrimethyltitanium solution and 5 mL of 20 mmol/L triphenylcarbonium tetra(pentafluorophenyl)borate solution each in toluene as the solvent. Then, in a 30 mL vessel which had been dried and purged with nitrogen were placed 10 mL of styrene and 250 L of the above-prepared mixed solution to proceed with polymerization at 70° C. for 4 hours. After the completion of the reaction, the reaction product was dried to afford 3.65 g of a polymer, which was subjected to Soxhlet extraction in the same manner as in Example 1. As the result, SPS was obtained as the raffinate at a yield of 3.47 g and a catalytic activity of 145.0 kg/g.Ti.

EXAMPLE 10

The procedure in Example 9 was repeated except that tri(p-chlorophenyl)carbonium tetra(pentafluorophenyl)borate solution was used in place of triphenylcarbonium tetra(pentafluorophenyl)borate solution. After the completion of the reaction, the reaction product was dried to give 3.86 g of a polymer, which was subjected to Soxhlet extraction in the same manner as in Example 1. As the result, SPS was obtained as the raffinate at a yield of 3.66 g and a catalytic activity of 153.0 kg/g.Ti.

EXAMPLE 11

There were mixed in advance 5 mL of 10 mmol/L pentamethylcyclopentadienyltrimethyltitanium solution and 5 mL of 20 mmol/L tri(p-methoxyphenyl)carbonium tetra(pentafluorophenyl)borate solution each in toluene as the solvent. Then, in a 30 mL vessel which had been dried and purged with nitrogen were placed 10 mL of styrene, 52.5 μmol of triisobutylaluminum and 250 μL of the above-prepared mixed solution to proceed with polymerization at 70° C. for 4 hours. After the completion of the reaction, the reaction product was dried to afford 6.50 g of a polymer, which was subjected to Soxlet extraction in the same manner as in Example 1. As the result, SPS was obtained as the raffinate at a yield of 6.46 g and a catalytic activity of 270.0 kg/g.Ti.

EXAMPLE 12

The procedure in Example 11 was repeated except that di(p-methoxyphenyl)-phenylcarbonium tetra(pentafluorophenyl)borate solution was employed in place of tri(p-methoxyphenyl)carbonium tetra(pentafluorophenyl)borate solution. After the completion of the reaction, the reaction product was dried to give 6.67 g of a polymer, which was subjected to Soxhlet extraction in the same manner as in Example 1. AS the result, SPS was obtained as the raffinate at a yield of 6.45 g and a catalytic activity of 270.0 kg/g.Ti.

EXAMPLE 13

The procedure in Example 11 was repeated except that pentamethylcyclopentadienyl trimethoxide solution was employed in place of pentamethylcyclopentadienyltrimethyltitanium solution. After the completion of the reaction, the reaction product was dried to give 4.95 g of a polymer, which was subjected to Soxhlet extraction in the same manner as in Example 1. AS the result, SPS was obtained as the raffinate at a yield of 4.88 g and a catalytic activity of 204.0 kg/g.Ti.

What is claimed is:

1. A process for producing a styrenic polymer having a high degree of syndiotactic configuration, comprising polymerizing at least one monomer selected from the group consisting of styrene, alkylstyrenes, alkoxystyrenes, halogenated styrenes and vinylbenzoate esters in the presence of a catalyst comprising:

(A) a titanium compound having formula (I)

$$TiR^1XYZ \qquad (I)$$

wherein $R^1$ is a cyclopentadienyl group, a substituted cyclopentadienyl group, an indenyl group, a substituted indenyl group, a fluorenyl group or a substituted fluorenyl group; and X, Y and Z, independently of one another, are each a hydrogen atom, an alkyl group having 1 to 12 carbon atoms, an alkoxy group having 1 to 12 carbon atoms, a thioalkoxy group having 1 to 20 carbon atoms, an aryl group having 6 to 20 carbon atoms, an aryloxy group having 6 to 20 carbon atoms, a thioaryloxy group having 6 to 20 carbon atoms, an arylalkyl group having 7 to 20 carbon atoms or a halogen atom, or said titanium compound has the formula (II)

$$Ti(R^2)_2R^3R^4 \qquad (II)$$

wherein each $R^2$ is identical and is a cyclopentadienyl group, a substituted cyclopentadienyl group, an indenyl group, a substituted indenyl group, a fluorenyl group or a substituted fluorenyl group, $R^3$ and $R^4$ are each a hydrogen atom, an alkyl group having 1 to 20 carbon atoms, an alkoxy group having 1 to 20 carbon atoms, a thioalkoxy group having 1 to 20 carbon atoms, an aryl group having 6 to 20 carbon atoms, an aryloxy group having 6 to 20 carbon atoms, a thioaryloxy group having 6 to 20 carbon atoms, an arylalkyl group having 7 to 20 carbon atoms, a halogen atom or an amino group; and $R^2$ may be crosslinked by an alkylidene group having 1 to 5 carbon atoms, an alkylsilyl group having 1 to 20 carbon atoms and 1 to 5 silicon atoms or a germanium-containing hydrocarbon group having 1 to 20 carbon atoms and 1 to 5 germanium ions; and (B) an ionic compound comprising a non-coordinate anion and a cation having the formula (V)

$$M^2R^8R^9R^{10} \qquad (V)$$

wherein $M^2$ is a carbonium cation, and $R^8$, $R^9$ and $R^{10}$, which may be the same or different, are each a hydrogen atom, an alkyl group having 1 to 20 carbon atoms, an aryl group having 6 to 20 carbon atoms, an alkoxy group having 1 to 20 carbon atoms or a thioalkoxy group having 1 to 20 carbon atoms, wherein said catalyst is free of an alkylating agent.

2. The process of claim 1, wherein said carbonium cation is selected from the group consisting of triphenyl carbonium cation, tri(methoxyphenyl)carbonium cation, di(methoxyphenyl)phenylcarbonium cation, tri(tolyl)carbonium cation, and 4,4',4"-tri(chlorophenyl)carbonium cation.

3. The process of claim 1, wherein said catalyst consists of said components (A) and (B).

4. The process of claim 1, wherein said catalyst is free of $R^8_3Al$, $R^8_2Mg$ and $R^8_2Zn$.

5. The process of claim 1, wherein said styrenic polymer has a proportion of racemic diads of at least 75%.

6. The process of claim 5, wherein said styrenic polymer has a proportion of racemic diads of at least 85%.

7. The process of claim 1, wherein said styrenic polymer has a proportion of racemic pentads of at least 30%.

8. The process of claim 7, wherein said styrenic polymer has a proportion of racemic pentads of at least 50%.

9. The process of claim 1, wherein said process produces from 5.1 to 270 kg (polymer)/g (Ti).

* * * * *